United States Patent [19]

Halley et al.

[11] Patent Number: 4,750,121

[45] Date of Patent: Jun. 7, 1988

[54] PENSION BENEFITS SYSTEM

[76] Inventors: Gustavo M. Halley, 1408 S. Bayshore Dr., Miami, Fla. 33131; Julio M. Yanes, 10084 N.W. 4 La., Miami, Fla. 33172

[21] Appl. No.: 783,610

[22] Filed: Oct. 3, 1985

[51] Int. Cl.$^4$ .............................................. G06F 15/30
[52] U.S. Cl. ..................................... 364/408; 364/401
[58] Field of Search ................. 235/379; 364/401, 408

[56] References Cited

PUBLICATIONS

J. Andresky, "Take Your Money and Run", *Forbes*, Apr. 23, 1984, vol. 123, p. 152.

Lebenson, "Split Funded Pension Plans: A Good Buy for the Small Businessman", *Life Associations News*, Sep. 1984, pp. 172–177.

"Employee Handbook" of the U.S. Dept. of Commerce, Nov. 1984, pp. 17-1 to 17-4.

*Primary Examiner*—Jerry Smith
*Assistant Examiner*—Gail O. Hayes
*Attorney, Agent, or Firm*—Charles J. Prescott; John C. Malloy

[57] ABSTRACT

An improved pension benefits system for enrolled employees of subscriber employers including a master trust institution and a life insurer institution. The master trust institution computes and receives each subscriber employer's periodic payment thereinto based primarily upon that employer's number of current employees, their ages and monthly earnings; purchases and retains a life insurance policy from the life insurance institution covering each enrolled employee; invests in available securities to generate interest income; provides specific accurate future projections of periodic benefits for retirement, death, or disability; receives all life insurance policy proceeds upon the death of each enrolled employee; and distributes all periodic payable benefits. Funding a significant portion of payable periodic benefits by life insurance policy proceeds retained within the master trust institution is one truly unique feature of this system; life insurance having prescribed amounts of whole life and progressive one-year term dividend rider components is yet another. The level of benefits begins to increase years, preferably at a fixed rate simple, from the date of enrollment of each employee, to help defer the effects of inflation on future purchasing power of future payable benefits.

34 Claims, 3 Drawing Sheets

PENSION BENEFITS SYSTEM

BACKGROUND OF THE INVENTION

This invention relates generally to pension plans, and more specifically, to an improved pension benefits system utilizing life insurance as a major vehicle for funding benefits.

Several Congressional acts since 1974 including ERISA and TEFRA have led the way in a Congressional attempt to stem the tide of under-funded or illusory pension benefits in the past. To a large extent, these Congressional efforts coupled with other judicial pronouncements have contributed to the demise rather than strengthening of many of these prior pension programs and have compelled drastic changes in those that remain. Several economic and social factors including inflation, longer life expectancies, higher interest rates, recession, bankruptcies and other economic factors have all taken heavy tolls on private pension plans.

More recently, many private pension plans which had moved to adopt defined benefits pension plans are now being forced to either amend or dissolve their programs, resulting in loss by employees of considerable unvested benefits and creating a new movement toward defined contributions programs which are completely open ended concerning levels of benefits and protection of future purchasing power.

The present system, while fully complying with all of the latest Congressional and judicial mandates, provides a novel fully funded pension benefits system which imposes considerably lower and fixed determinable financial burdens upon the employer and relieves him of all administrative and fiduciary responsibility, while also providing expanded, accurately predictable, and increasing benefits to all enrolled employees. Benefits are expanded in that, in addition to periodic retirement payments after age 65, both death and disability benefits are also provided. Rather than being fixed or completely undeterminable, all benefits provided by the present system are projectable from the onset of a program with any subscriber employer so that each enrolled employee may determine his future benefits resulting from death, disability, or retirement and be assured that because of a built-in fixed percentage of increasing benefits, that the benefits he receives will keep pace with inflation, retaining his purchasing power. The marvels of this new improved pension system are, in large part, achieved by a unique implementation of life insurance to fund future payable liabilities by a master trust. Rather than terminating life insurance at employee retirement, each policy is maintained in force by the master trust until the employee's death, the proceeds flowing into the master trust to assist in paying all future periodic benefits.

BRIEF SUMMARY OF THE INVENTION

The present invention is that of an improved pension benefits system for enrolled employees of subscriber employers including a master trust institution and a life insurer institution. The functions of the master trust institution include: computing and receiving each subscriber employer's periodic payment thereinto based primarily upon that employer's number of current employees, their ages and monthly earnings; purchasing and retaining a life insurance policy from the life insurance institution covering each enrolled employee; investing in available securities, preferably those federally guaranteed, to generate interest income; providing specific accurate future projections, preferably in table form, of periodic benefits for retirement, death, or disability; receiving all life insurance policy proceeds upon the death of each enrolled employee; and distributing all periodic payable benefits. Funding a significant portion of payable periodic benefits by life insurance policy proceeds retained within the master trust institution is one truly unique feature of this system; life insurance having prescribed amounts of whole life and increasing one-year term dividend rider components is yet another.

It is an object of the present invention to provide an improved pension system which will both reduce and accurately define employer contributions while eliminating all employee contributions, if that is the chosen arrangement between employer and employees.

It is another object of this invention to provide a unique pension system which provides periodic benefits upon death, disability, or retirement of each enrolled employee.

It is still another object of this invention to provide the above pension benefits system whose benefits are automatically increased at predetermined fixed rates to help keep pace with inflation.

Still another object is to provide the above invention fully funded in part by a unique utilization of life insurance.

In accordance with these and other objects which will become apparent hereinafter, the instant invention will now be described with reference to the accompanying drawings in which:

DETAILED DESCRIPTION OF THE INVENTION

Figure 1:
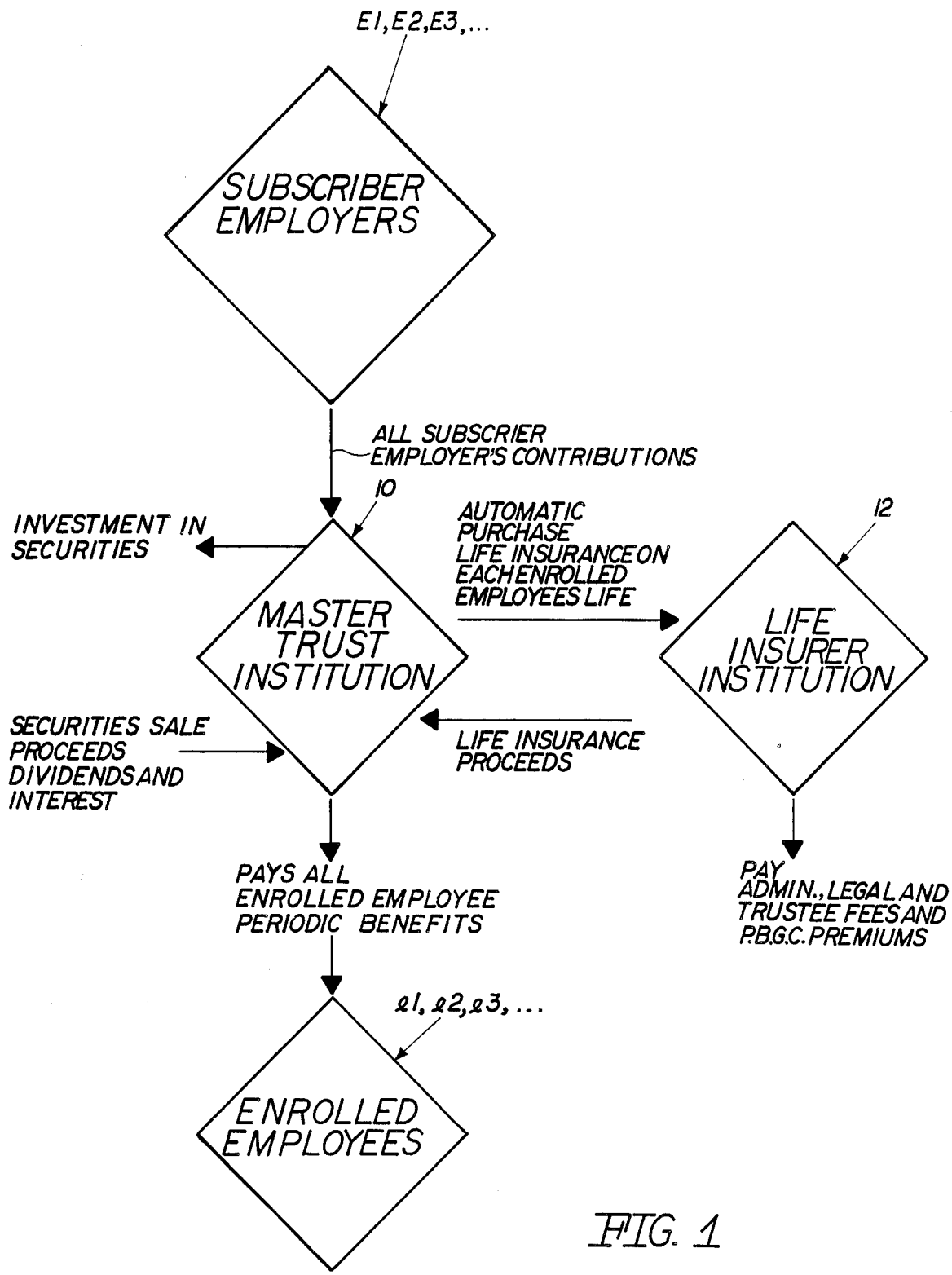
FIG. 1 is a schematic flow diagram of the entire pension benefits system.

Referring now to the Figures, and particularly to FIG. 1, the system of the present invention includes a master trust institution 10 and a life insurance institution 12, which relate and exist functionally as follows. Each subscriber employer E1, E2, E3 . . . , makes a predetermined periodic contribution into the master trust institution 10. The master trust institution 10, including an independent trustee, then, continuously and regularly performs several functions. A portion of each subscriber employer's contribution is applied for purchasing a predetermined life insurance policy against each enrolled employee's life from the life insurance institution 12.

A significant portion of the funding of all payable enrolled employee periodic benefits to enrolled employees e1, e2, e3, . . . is achieved through the unique utilization of predetermined amounts of life insurance. The master trust institution 10 receives and retains all life insurance policies and subsequently receives all life insurance proceeds at the death of each employee e1, e2, e3, . . . In addition to the insurance issuance of life insurance policies in predetermined amounts and payment of life insurance proceeds into the master trust institution 10, the life insurance institution 12 also pays all administrative and legal expenses, as well as Pension Benefits Guarantee Corp (P.B.G.C.) premiums as required by Federal law.

The other portions of each subscriber employer's contribution are used to purchase securities on the open market. The securities in which the master trust institution 10 is limited to investing in must provide predetermined levels of guaranteed interest returned on investment in order to maintain a fully funded established level of employee benefits. Such preferred securities investments include Federaly Government backed securities.

All dividends and interest proceeds from these investments in securities are received into the master trust institution 10 and utilized for payment of employee periodic benefits.

Figure 2:
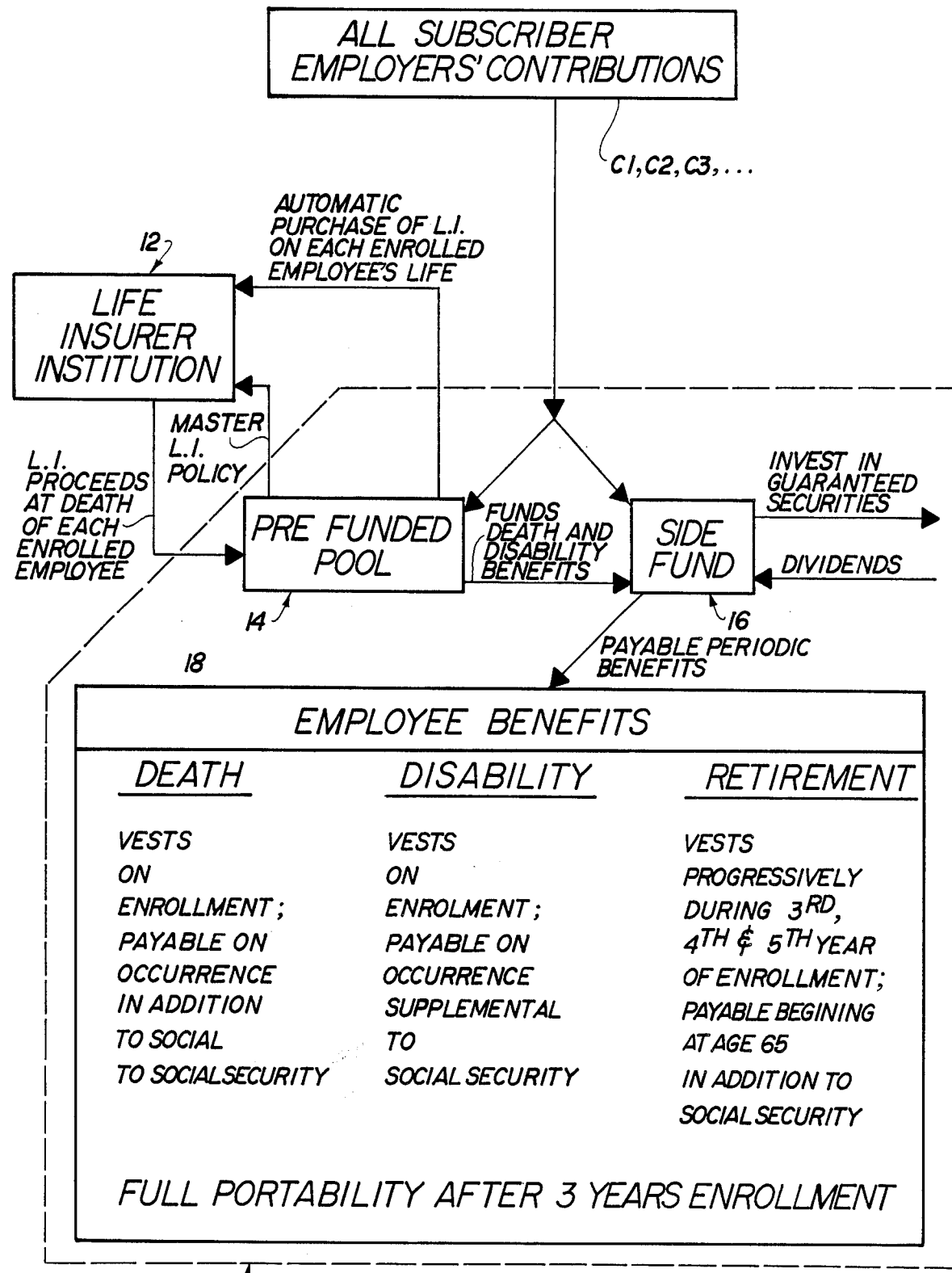
FIG. 2 is a schematic flow diagram of the entire system showing the preferred embodiment of the master trust institution.

Referring now to FIG. 2, the preferred embodiment of the master trust institution is shown in more detail at 10'. All subscriber employer's contributions C1, C2, C3, . . . are received into the master trust institution 10' and are divided into predetermined portions, the first portion being received into the pre-funded pool 14, the second portion being received into the side fund 16. The pre-funded pool, using its portion of subscriber employer contributions C1, C2, C3, . . . , purchases a master life insurance policy from the life insurer institution 12 and, then, under that master policy, automatically purchases predetermined amounts of life insurance on each enrolled employee's life. The fact that life insurance is used universally in this system to fund both pre-retirement, post-retirement, and disability benefits produces a significant cost savings for this system, rather than self-insuring. Whereas typically life insurance held by individuals or otherwise is converted to an annuity at retirement, the pre-funded pool 14 retains the life insurance policy on each employee until death. Life insurance proceeds are then received into the pre-funded pool 14 to pay for death benefits, which are periodic in nature rather than in lump sum form. Coupled with a whole life insurance policy on each enrolled employee's life, the pre-funded pool 14 also automatically purchases a one-year term dividend increasing term rider in conjunction with each whole life policy, providing for increasing proceeds without the expense of first year agent commissions and additional policy fees and handling expenses by the life insurer institution 12.

While typically the rest of the pension world dictates that when an employee retires, his life insurance policy should be surrended in facor of a cash surrender value to help pay retirement benefits, the present system retains the whole life policy in force until death. The one year progressive term dividend rider portion of the life insurance is terminated at age 65, because the risk of payment of disability and death benefits and pre-retirement are no longer a risk for the master trust institution 10'. The benefits to the master trust institution by retaining the whole life insurance policy in force until employee's death amounts to approximately 20 to 25 percent increased revenues into the master trust institution as compared with the cash surrender value of that whole life insurance policy at retirement age 65.

Once the level of employee benefits have been established, the level of life insurance policy is then established. In the preferred embodiment, the amount of whole life insurance is typically equal to about 30 times the employee's monthly salary, while the one year term dividend rider is equal to approximately one month of the employee's salary increasing yearly automatically to age 65. An important secondary benefit in the choice of the one year progressive term dividend rider is that all cash dividends yields therefrom are accumulated within the life insurer institution 12. By this dividend accumulation, after 10 years or other predetermined period of time, the accumulated dividends from the whole life policy are sufficient such that all future life insurance premiums for both the whole life portion and the increasing term dividend portion will be automatically paid from accumulated dividends for each employee's policy after 10 years of participation in the system. Thereafter, all subscriber employer's contributions C1, C2, C3, . . . will be diverted directly into the side fund 16.

All monies received into the side fund 16, including at least a portion of employer's contributions, and proceeds from life insurance policies upon employees' deaths, are invested in guaranteed rate of return securities. These typically are in the form of Federally backed securities, paying predetermined minimum levels of interest and/or dividends.

By the accumulation of predetermined returns on securities' investments and life insurance proceeds, as well as continuing employer's contributions C1, C2, C3, . . . , the side fund 16 is able to meet, on a fully funded basis, all payable periodic benefits for enrolled employees. These benefits include periodic payments upon death, disability, or retirement of each employee. As indicated in FIG. 2, death benefits vest upon the enrollment by the subscriber employer into the system, and are payable beginning immediately upon the death of an employee to the employee's beneficiaries. These periodic death benefits are payable for a predetermined period of years. Disability benefits vest also on enrollment of the subscriber employer, and are payable upon the occurrence of the disability in supplemental form to Social Security such that the total amount of periodic benefits received by the disabled employee is at a predetermined level. Retirement benefits vest progressively during the third, fourth, and fifth year of enrollment of each employee. After the third year, approximately 50 percent of the retirement benefits are vested; during the fourth year, approximately 75 percent of retirement benefits are vested; and, during the fifth year, 100 percent of all retirement benefits have vested for each employee. As noted, all employee benefits are fully portable after three years of enrollment in the system. This feature provides that the employee, after three years of employment with one subscriber employer may take employment with another enrolled employer without loss of benefits, and will continue to accumulate benefits upon further employment with the new subscriber employer.

Obviously, in order to be fully funded, the system must be based upon defined definitions of levels of benefits for death, disability, and retirement for each employee. All benefits are periodic, and preferably monthly, and are equal to a fixed percentage of each enrolled employee's final monthly average income. The system provides a formula for determining that final income level which is the greater of:

i. the last projected salary to age 64, the monthly salary at entry age increased 5 percent yearly (simple interest) to age 64; or ii. career average salary to age 60; or iii. average monthly salary between age 56 and 60 increased a predetermined percentage of 5% simple interest to age 64.

Obviously, item i. above provides the minimum projected periodic benefits which would be available to each employee, and may be easily computed at the onset of the program for each employee. Alternately, this minimum level of benefits at any point in the employee's career that he becomes disabled or dies, or retires at age 65, may be incorporated into table form whereby his entry level salary may be multiplied by a factor determined by the pre-established inflation factor as a percentage of benefits' yearly increase and the number of years of service. This factor which may be easily located in table form, may be multiplied by the entry level salary to establish the minimum expected benefits which would be payable periodically to the employee upon the occurrence of one of the benefits triggers. Although periodic benefits may be higher, this table would establish the minimum expected periodic benefits.

Figure 3:
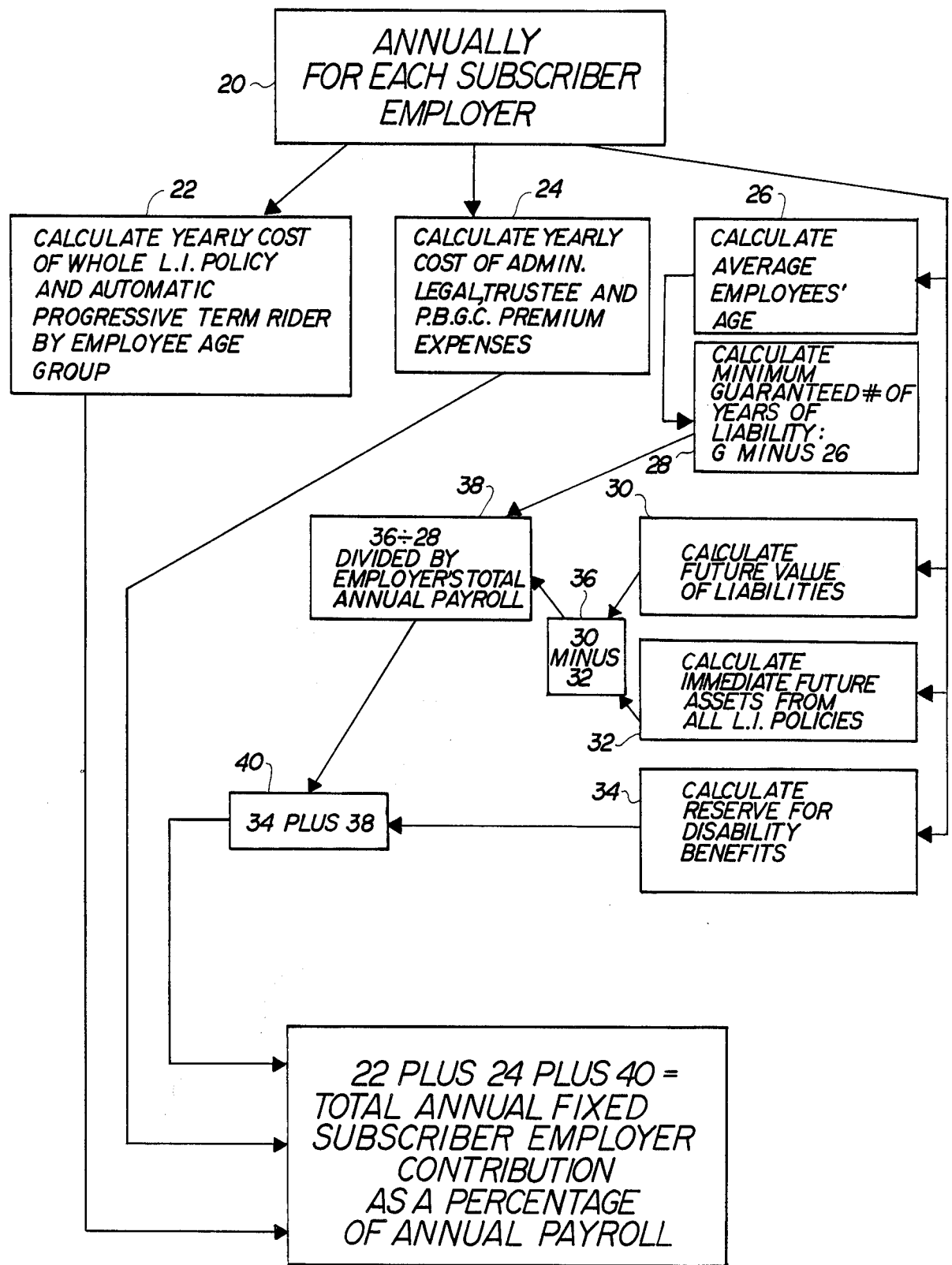
FIG. 3 is a schematic flow diagram of the subscriber employer contribution comprising means for computing each subscriber employer's periodic contribution into the master trust institution.

Referring now to FIG. 3, the subscriber employer contribution computing means for determining each subscriber employer's periodic contribution into the master trust institution is shown. This calculation of employer contribution is calculated preferably annually for each employer at 20. As indicated at 22, the yearly cost of whole life insurance and automatic progressive term rider policies for each employee by age group is determined. Because each employee's policy is issued under a master policy which has been pre-established between the master trust institution and the life insurance institution, costs and administrative costs of administration are minimized. At 24, the yearly costs of administration, attorney, trustee, and P.B.G.C. premium expenses are also determined. Next in parallel and simultaneously, at 26, the average age of all enrolled employees for each subscriber employer is calculated, after which at 28, the minimum number of years of liability is determined. The letter "G" is a predetermined number of years, typically between 65 and 80, which is the minimum guaranteed age to which periodic benefits are to be paid on a continuous and certain basis. At 30, the future value of all liabilities are calculated based upon the previously discussed minimum benefits projection at age 65, and assumed minimum number of years of continuous and certain payable benefits until age "G" which will be increased by the assumed simple interest percentage per year after retirement. At 32, the immediate future assets of all life insurance policies issued for each subscriber employer's employees is determined. Then, at 34, a reserve is determined for providing disability benefits which vest upon subscriber employer enrollment, and will be incurred by a predetermined actuarially established number of employees. This reserve at 34 is typically a percentage of subscriber employer's annual payroll.

By reducing the future value of liabilities at 30 by the immediate value or future life insurance policy proceeds 32, at 36, then dividing that amount at 36 by the minimum guaranteed number of years of liability 28, the percentage of employer annual payroll is determined which will fund all benefits during the first period of the system's adoption before life insurance dividends begin to automatically pay life insurance premiums.

The total annual fixed subscriber employer's contribution as a percentage of his annual or otherwise periodic payroll is determined at C1, C2, C3, . . . to equal the sum of the yearly cost of all life insurance premiums at 22, the yearly cost of administration, attorney, trustee and P.B.G.C. premium expenses at 24, and the disability reserve at 34 plus the pre-dividend payment of life insurance premiums at 38. Thus, by the means described in FIG. 3, each subscriber employer's annual or periodic contributions into the master trust institution which will fully fund all of the above-described benefits, is determined as a fixed percentage of its payroll.

BASIC ASSUMPTIONS

Obviously, one primary assumption in this pension benefits system is the current life expectancy of employees. This is assumed to be equal between men and women and is determined actuarially on a yearly basis. Because no pension benefits are payable before the sixth year of employer participation, the only financial exposure during that period would be from death or disability of an employee. Therefore, during this first five year start-up period, the liabilities are treated and calculated separately and fully funded separately. After ten years, life insurance premiums begin to be paid by the whole life policy dividend accumulations. Thereafter, all life insurance premiums for a given subscriber employer are paid substantially, if not totally, by dividend accumulations within the life insurance institution. Because at the pre-established age of retirement of each employee the risk of having to pay pre-retirement death or disability benefits is extinguished, the term rider portion of the life insurance policy is discontinued for each particular enrolled employee. However, the accumulated dividends from that whole life policy will continue to automatically pay the whole life insurance policy premiums on each employee after his retirement age.

All employee periodic benefits are increased annually throughout the duration of their participation in the program and into retirement in order to compensate for loss of purchasing power due to inflation. However, rather than tying benefits level to uncontrollable cost of living indexes or the like, this system incorporates predetermined fixed simple interest percentages of yearly benefits increases based upon the employee's start-up salary. The benefits tables discussed earlier provide an easy index for determining minimum future payable benefits, that is, benefits which are upwardly adjusted annually according to the predetermined yearly simple percentage rate of increase.

Death benefits are presumed to be required by the employee's beneficiaries only for a fixed period of years. Thereafter, periodic benefits will terminate. However, disability benefits are payable periodically to the employee as a supplement to Social Security until death. These benefits for disability will increase according to the assumed fixed simple interest inflation factor until age "G" and level thereafter until death. Likewise, retirement benefits continue to increase by the inflation factor simple interest until age "G," and level thereafter until death.

An important marketing aspect of the present invention is provided in the fact that under current marketing of existing pension plans, only specialized knowledgeable agents are qualified to work with employers to implement their programs. Further, in many cases, the employer must become a fiduciary and trustee for pension benefits contributions by employees. Under the instant system, virtually any life insurance agent knowledgeable in life insurance programs, procedures, and policies is eligible to present and implement this system with any employer having a minimum number of employees. All actuarial assumptions and calculations of employer contributions are predetermined in the system and calculated and implemented by the master trust which includes an independent trustee as fiduciary.

Certain cash reserves are available to the second funded pool which need not otherwise be set aside to pay the above-described enrolled employee benefits. These reserves become available upon the occurrence of certain conditions or factors in conjunction with each enrolled employee and do so because the subsequent periodic benefits are otherwise funded within the master trust institution by at least one component of the above-described life insurance policy on each enrolled employee's life. A first cash reserve is available within the second funded pool upon the termination of each enrolled employee in the form of pre-retirement age death. The first cash reserve is in the form and amount of funds within the second funded pool generally equal to all previous subscriber employer contributions related to that deceased enrolled employee. A second cash reserve is available within the second funded pool upon the termination of each enrolled employee in the form of enrolled employee turnover (employment termination). This second cash reserve is in the form and amount of funds within the second funded pool also generally equal to all previous subscriber employer contribution related to that deceased enrolled employee. A third cash reserve is deposited into the second funded pool upon the post-retirement age death of each enrolled employee generally equal to all proceeds of life insurance available from the life insurance institution through the first funded pool upon the post-retirement death of each enrolled employee.

While the instant invention has been shown and described herein in what is conceived to be the most practical and preferred embodiment, it is recognized that departures may be made therefrom within the scope of the invention, which is therefore not to be limited to the details disclosed herein but is to be accorded the full scope of the claims so as to embrace any and all equivalent apparatus and articles.

What is claimed is:

1. A pension benefits system for administering at least one subscriber employer account on behalf of each subscriber employer's enrolled employees each of whom are to receive periodic benefits payments, said system comprising:
   a master trust; and
   a life insurer;
   said master trust including:
      subscriber employer contribution computing means for computing and receiving each said subscriber employer's particular periodic contribution;
      life insurance procurement means for procuring from said life insurer with a portion of each said subscriber employer contribution a predetermined life insurance policy for each said enrolled employee's life, each said life insurance policy retained by, and naming as its beneficiary, said master trust;
      life insurance proceeds collecting means for receiving and retaining from said life insurer all said life insurance policy proceeds upon each enrolled employee's death;
      benefits calculating means for determining each said enrolled employee's periodic benefits;
      investment means for procuring, with another portion of each said subscriber employer contribution, investments having expected rates of return and degrees of investment security and receiving and retaining all proceeds from said investments;
      periodic benefits payment means for disbursing payable periodic benefits from said life insurance policy proceeds, said investments' proceeds and said subscriber employer contributions.

2. A pension benefits system as set forth in claim 1, said master trust further including:
   integrated administration payment means for automatic payment of fees incurred in administration, legal counsel, trusteeship, and P.B.G.C. insurance premiums.

3. A pension benefits system as set forth in claim 1, further comprising:
   tabularized means for predetermining all payable and future projected employee periodic benefits.

4. A pension benefits system as set forth in claim 3, wherein, said tabular means includes:
   factor indicia which is to be multiplied with each enrolled employee's monthly earnings to predetermine said periodic benefits.

5. A pension benefits system as set forth in claim 4, wherein:
   said factor indicia means is equal to about 40% of a unit of earnings increased by the addition to said unit of earnings by a predetermined fixed inflation factor as a percentage of said unit once yearly for each enrolled employee between 65 and each enrolled employee's age at time of enrollment.

6. A pension benefits system as set forth in claim 5, wherein:
   said predetermined inflation factor is about 5%.

7. A pension benefits system as set forth in claim 1, wherein said pension benefits include:
   periodic retirement benefits payments;
   periodic death benefits payments; and
   periodic disability benefits payments.

8. A pension benefits system as set forth in claim 7, wherein:
   each enrollable employee is between the ages of 18 and 60 to be eligible for participation in said system.

9. A pension benefits system as set forth in claim 1, wherein:
   said pension benefits include periodic retirement benefits payments, periodic death benefits payments, and periodic disability benefits payments;
   said periodic death and disability benefits payments vest for each enrolled employee as of the first data of employer subscription into said system;
   said periodic retirement benefits payments for each enrolled employee vest 50% after 3 years, 75% after 4 years, and 100% after 5 years from the first date of employer subscription into said system.

10. A pension benefit system as set forth in claim 9, wherein:
    said employee death, disability, and retirement benefits payments vest and are fully portable between different subscriber employers in said system after a predetermined period of continuous enrollment.

11. A pension benefit system as set forth in claim 9, further comprising:

a first cash reserve which is allocated within said second funded pool as a result of early pre-retirement age death of each enrolled employee generally equal to about all said subscriber employer's previous contributions into said second funded pool upon each said enrolled employee's preretirement death;

a second cash reserve which is allocated within said second funded pool as a result of each enrolled employee turnover generally equal to about all said subscriber employer's previous contributions into said second funded pool until each said enrolled employee's turnover;

a third cash reserve which is deposited into said second funded pool as a result of post-retirement age death of each enrolled employee generally equal to about all said life insurance proceeds available from said life insurance institution upon each said enrolled employee's post-retirement age death.

12. A pension benefit system as set forth in claim 1, wherein said subscriber employer periodic contribution computing means includes:

average age computing means for determining the average age of each enrolled employee;

life insurance cost computing means for determining periodic cost of said life insurance for all enrolled employees of said subscriber employer;

administrative cost computing means for estimating all administrative, legal, trustee, and P.B.G.C. premium yearly expenses for said subscriber employer;

first mathematical component for estimating minimum number of years of benefits liability to said master trust for each said subscriber employer including reducing the minimum expected age for each enrolled employer to receive benefits by said average age of enrolled employees for each subscriber employer;

second methematical component for estimating the future value of all life insurance proceeds from each said subscriber employers enrolled employees:

third mathematical component for estimating the immediate future assets of all life insurance policies issued for all enrolled employees for each said subscriber employer;

fourth mathematical component for estimating a cash reserve to fund contingent disability benefits;

first mathematical product means for computing predividend component of each subscriber employer's contribution for said procuring of a life insurance policy for each enrolled employee including reducing said second mathematical component by said third mathematical component divided by said first mathematical component to produce a first divident which is then divided by said subscriber employer's periodic payroll;

second mathematical product means for computing said subscriber employer's said periodic contribution including summing said first mathematical product means, said fourth mathematical component, said periodic cost of said life insurance, and said expenses.

13. A pension benefits system as set forth in claim 1, wherein:

said investments are securities and are Federally insured.

14. A pension benefits system as set forth in claim 1, wherein each said life insurance policy includes:

a whole life policy and a progressive one year term divided rider coupled with said whole life policy on each enrolled employee's life.

15. A pension benefits system as set forth in claim 14, wherein:

each said whole life policy has a face amount generally equal to 30 times the enrolled employee's monthly earnings at time of enrollment;

each said progressive term dividend rider is generally equal to the enrolled employee's monthly earnings at the time of enrollment.

16. A pension benefits system as set forth in claim 14, wherein:

each said whole life policy is maintained by said life insurer in full force and effect until the death of each said enrolled employee, whether working or retired;

each said rider is maintained by said life insurer in full force and effect until a predetermined retirement age or earlier death of each said enrolled employee.

17. A pension benefits system as set forth in claim 14, wherein:

each said whole life policy produces dividends which are accumulated and retained by said life insurer;

said dividends accumulate sufficiently after a predetermined number of years of participation by each said enrolled employee and designated to automatically pay for all subsequent life insurance policy premiums whereupon each said portion of each said subscriber employer's contribution for procuring each said life insurance policy is retained within said master trust.

18. A pension benefits system as set forth in claim 14, wherein:

each said rider yearly increases said insurance policy proceeds a predetermined amount until said predetermined retirement age or earlier death of each said enrolled employee.

19. A pension benefits system set forth in claim 1, wherein said master trust includes: a first funded pool including said employer contribution computing means, said life insurance procurement means, said life insurance proceeds collection means, and said benefits calculating means; a second fund pool including said securities investment means and said periodic benefits payment means; said first funded pool having life insurance proceeds transfer means for conveying said insurance proceeds to said second funded pool for said disbursement of said payable periodic benefits; and a trustee for performing fiduciary duties on behalf of each subscriber employer and enrolled employees.

20. A pension benefits system for administering at least one subscriber employer account on behalf of each subscriber employer to provide periodic benefits payments for enrolled employee beginning at the earliest of death, disability or retirement of each enrolled employee, said system comprising:

a master trust; and a life insurer;

said master trust including:

subscriber employer contribution computing means for computing and receiving each said subscriber employer's particular periodic contribution; life insurance procurement means for procuring from said life insurer with a portion of each said subscriber employer contribution a predetermined life insurance policy against each enrolled employee's life, each said life insurance policy retained by, and naming as its beneficiary, said master trust, and each said life insurance policy including a whole life policy and a progressive one year term dividend rider coupled with said whole life policy for each said enrolled employee's life;

life insurance proceeds collecting means for receiving and retaining from said life insurer all said life insurance policy proceeds upon each said enrolled employee's death;

benefits calculating means for determining each said enrolled employee's periodic benefits;

investment means for procuring, with another portion of each said subscriber employer contribution, investments having expected rates of return and degrees of investment security and receiving and retaining all proceeds from said investments;

periodic benefits payment means for disbursing payable said periodic benefits from said life insurance policy proceeds, said investments' proceeds and said subscriber employer contributions.

21. A pension benefits system as set forth in claim 20, wherein:

each said whole life policy is maintained by said life insurer in full force and effect until the death of each said enrolled employee, whether working or retired;

each said rider is maintained by said life insurer in full force and effect until a predetermined retirement age or earlier death of each said enrolled employee.

22. A pension benefits system as set forth in claim 20, wherein:

each said whole life policy produces dividends which are accumulated and retained by said life insurer;

said dividends accumulate sufficiently after a predetermined number of years of participation by each said enrolled employee and designated to automatically pay for all subsequent life insurance policy premiums whereupon each said portion of each said subscriber employer's contribution for procuring each said life insurance policy is retained within said master trust.

23. A pension benefits system as set forth in claim 20, wherein:

each said rider yearly increases said insurance policy proceeds a predetermined amount until said predetermined retirement age or earlier death of each said enrolled employee.

24. A pension benefits system as set forth in claim 20, wherein said subscriber employer periodic contribution computing means includes:

average age computing means for determining the average age of each enrolled employee;

life insurance cost computing means for determining periodic cost of said life insurance for all enrolled employees of said subscriber employer;

administrative cost computing means for estimating all administrative, legal, trustee, and P.B.G.C. premium yearly expenses for said subscriber employer;

first mathematical component for estimating minimum number of years of benefits liability to said master trust for each said subscriber employer including reducing the minimum expected age for each enrolled employer to receive benefits by said average age of enrolled employees for each subscriber employer;

second mathematical component for estimating the future value of all life insurance proceeds from each said subscriber employers enrolled employees;

third mathematical component for estimating the immediate future assets of all life insurance policies issued for all enrolled employees for each said subscriber employer;

fourth mathematical component for estimating a cash reserve to fund contingent disability benefits;

first mathematical product means for computing pre-dividend component of each subscriber employer's contribution for each said procuring of a life insurance policy for each enrolled employee including reducing said mathematical component by said third mathematical component divided by said first mathematical component to produce a first dividend which is then divided by said subscriber employer's periodic payroll;

second mathematical product means for computing said subscriber employer's said periodic contribution including summing said first mathematical product means, said fourth mathematical component, said periodic cost of said life insurance, and said expenses.

25. A pension benefits system to be implemented by a life insurer for administering at least one subscriber employer account on behalf of each subscriber employer's enrolled employees each of whom are to receive periodic benefits payments, said system comprising:

subscriber employer contribution computing means for computing and receiving each subscriber employer's particular periodic contribution; life insurance providing means for issuing by said life insurer with a portion of each said subscriber employer contribution a predetermined life insurance policy against each enrolled employee's life, each said life insurance policy retained by, and naming as its beneficiary, said master trust, and each said life insurance policy including a whole life policy and a progressive one year term dividend rider coupled with said whole life policy for each enrolled employee's life;

life insurance proceeds collecting means for receiving and retaining from said life insurer all said life insurance policy proceeds upon each enrolled employee's death;

benefits calculating means for determining each enrolled employee's periodic benefits;

investment means for procuring, with another portion of each said subscriber employer contribution, investments having expected rates of return and degrees of investment security and for receiving and retaining all proceeds from said investments;

periodic benefits payment means for disbursing payable periodic benefits from said life insurance policy proceeds, said securities' proceeds and said subscriber employer contributions.

26. A pension benefits system as set forth in claim 25, wherein:

each said whole life policy is maintained by said life insurer in full force and effect until the death of each said enrolled employee, whether working or retired;

each said rider is maintained by said life insurer in full force and effect until a predetermined retirement age or earlier death of each said enrolled employee.

27. A pension benefits system as set forth in claim 25, wherein:

said pension benefits include periodic retirement benefits payments, periodic death benefits payments, and periodic disability benefits payments;

said periodic death and disability benefits payments vest for each enrolled employee as of the first date of employer subscription into said system;

said periodic retirement benefits payments for each enrolled employee vest 50% after 3 years, 75% after 4 years, and 100% after 5 years from the first date of employer subscription into said system.

28. A pension benefits system as set forth in claim 25, wherein said subscriber employer periodic contribution computing means includes:

average age computing means for determining the average age of each enrolled employee;

life insurance cost computing means for determining periodic cost of said life insurance for all enrolled employees of said subscriber employer;

administrative cost computing means for estimating all administrative, legal, trustee, and P.B.G.C. premium yearly expenses for said subscriber employer;

first mathematical component for estimating minimum number of years of benefits liability to said master trust for each said subscriber employer including reducing the minimum expected age for each enrolled employer to receive benefits by said average age of enrolled employees for each subscriber employer;

second mathematical component for estimating the future value of all life insurance proceeds from each said subscriber employers enrolled employees;

third mathematical component for estimating the immediate future assets of all life insurance policies issued for all enrolled employees for each said subscriber employer;

fourth mathematical component for estimating a cash reserve to fund contingent disability benefits;

first mathematical product means for computing pre-dividend component of each subscriber employer's contribution for each said procuring of a life insurance policy for each enrolled employee including reducing said mathematical component by said third mathematical component divided by said first mathematical component to produce a first dividend which is then divided by said subscriber employer's periodic payroll;

second mathematical product means for computing said subscriber employer's said periodic contribution including summing said first mathematical product means, said fourth mathematical component, said periodic cost of said life insurance, and said expenses.

29. A pension benefits system to be implemented by an employer on behalf of each employer's enrolled employees each of whom are to receive periodic benefits payments, said system comprising:

a master trust; and a life insurer;

said master trust including:

employer contribution computing means for computing and receiving each employer's particular periodic contribution; life insurance procurement means for procuring from said life insurer with a portion of each said employer contribution a predetermined life insurance policy against each enrolled employee's life, each said life insurance policy retained by, and naming as its beneficiary, said master trust, and each said life insurance policy including a whole life policy and a progressive one year term dividend rider coupled with said whole life policy for each enrolled employee's life;

life insurance proceeds collecting means for receiving and retaining from said life insurer all said life insurance policy proceeds upon each enrolled employee's death;

benefits calculating means for determining each enrolled employee's periodic benefits;

investment means for procuring, with another portion of each said subscriber employer contribution, investments having expected rates of return and degrees of investment security and for receiving and retaining all proceeds from said investments;

periodic benefits payment means for disbursing payable periodic benefits from said life insurance policy proceeds, said securities' proceeds and said employer contributions.

30. A pension benefits system as set forth in claim 29, wherein:

each said whole life policy is maintained by said life insurer in full force and effect until the death of each said enrolled employee, whether working or retired;

each said rider is maintained by said life insurer in full force and effect until a predetermined retirement age or earlier death of each said enrolled employee.

31. A pension benefits system as set forth in claim 29, wherein:

each said rider yearly increases said insurance policy proceeds a predetermined amount until said predetermined retirement age or earlier death of each said enrolled employee.

32. A pension benefits system as set forth in claim 29, wherein:

said pension benefits include periodic retirement benefits payments, periodic death benefits payments, and periodic disability benefits payments;

said periodic death and disability benefits payments vest for each enrolled employee as of the first date of employer subscription into said system;

said periodic retirement benefits payments for each enrolled employee vest 50% after 3 years, 75% after 4 years, and 100% after 5 years from the first date of employer subscription into said system.

33. A pension benefits system as set forth in claim 29, wherein said subscriber employer periodic contribution computing means includes:

average age computing means for determining the average age of each enrolled employee;

life insurance cost computing means for determining periodic cost of said life insurance for all enrolled employees of said subscriber employer;

administrative cost computing means for estimating all administrative, legal, trustee, and P.B.G.C. premium yearly expenses for said subscriber employer;

first mathematical component for estimating minimum number of years of benefits liability to said master trust for each said subscriber employer including reducing the minimum expected age for each enrolled employer to receive benefits by said average age of enrolled employees for each subscriber employer;

second mathematical component for estimating the future value of all life insurance proceeds from each said subscriber employers enrolled employees;

third mathematical component for estimating the immediate future assets of all life insurance policies issued for all enrolled employees for each said subscriber employer;

fourth mathematical component for estimating a cash reserve to fund contingent disability benefits;

first mathematical product means for computing predividend component of each subscriber employer's contribution for each said procuring of a life insurance policy for each enrolled employee including reducing said mathematical component by said third mathematical component divided by said first mathematical component to produce a first dividend which is then divided by said subscriber employer's periodic payroll;

second mathematical product means for computing said subscriber employer's said periodic contribution including summing said first mathematical product means, said fourth mathematical component, said periodic cost of said life insurance, and said expenses.

34. A method of funding and administering an employee benefits system for at least one subscriber employer account on behalf of each subscriber employer's enrolled employees each of whom are to receive periodic benefits payments, said system comprising the steps of:

A. Computing and receiving each said subscriber employer's particular periodic contribution;

B. Procuring from a life insurer with a portion of each said subscriber employer contribution a predetermined life insurance policy against each said enrolled employee's life;

each said life insurance policy retained by, and naming as its beneficiary, a master trust;

each said life insurance policy including a whole life policy and a progressive one year term dividend rider coupled with said whole life policy for each enrolled employee's life;

C. Receiving and retaining from said life insurer into said master trust all said life insurance policy proceeds upon each said enrolled employee's death;

D. Calculating each said enrolled employee's periodic benefits;

E. Investing another portion of each said subscriber employer contribution to generate revenues and receiving and retaining all said revenues from said investing;

F. Disbursing said periodic benefits from said life insurance policy proceeds, said investing revenues and said subscriber employer contributions.

* * * * *